United States Patent
Courtright et al.

(10) Patent No.: US 6,976,504 B2
(45) Date of Patent: Dec. 20, 2005

(54) SELECTABLE DETENT RELIEF VALVE

(75) Inventors: Dennis O. Courtright, Portland, OR (US); John P. Tow, Easley, SC (US); David L. Sigl, Charlotte, NC (US)

(73) Assignees: Sauer-Danfoss Inc., Ames, IA (US), part interest; Deere and Company, Moline, IL (US), part interest ( * ) Notice: Subject to any disclaimer, the term of this patent is extended or adjusted under 35 U.S.C. 154(b) by 313 days.

(21) Appl. No.: 10/418,969

(22) Filed: Apr. 18, 2003

(65) Prior Publication Data

US 2004/0206407 A1    Oct. 21, 2004

(51) Int. Cl.[7] .................. F16K 31/00; F16K 11/072
(52) U.S. Cl. .................... 137/624.27; 137/625.21
(58) Field of Search .................. 137/625.21, 624.27

(56) References Cited

U.S. PATENT DOCUMENTS

| | | | |
|---|---|---|---|
| 2,862,518 A | * | 12/1958 | McAlvay ............... 137/624.27 |
| 2,874,720 A | * | 2/1959 | Vahs ..................... 137/624.27 |
| 3,392,957 A | * | 7/1968 | Schorer ................. 137/624.27 |
| 3,511,276 A | * | 5/1970 | Jessen et al. .......... 137/624.27 |
| 3,738,379 A | | 6/1973 | Wilke |
| 3,818,926 A | | 6/1974 | Wohlwend |
| 3,866,880 A | | 2/1975 | Schexnayder |
| 3,972,264 A | | 8/1976 | Field, Jr. et al. |
| 4,257,456 A | | 3/1981 | Elliston |
| 4,334,553 A | | 6/1982 | Hajek, II et al. |
| 4,339,987 A | * | 7/1982 | Stephenson et al. ... 137/624.27 |
| 4,501,451 A | * | 2/1985 | Reynolds et al. ...... 137/624.27 |
| 4,651,972 A | * | 3/1987 | Yankoff ................. 137/627.27 |

* cited by examiner

*Primary Examiner*—John Rivell

(57) ABSTRACT

A selectable detent relief valve of this invention is used to operate a hydraulic detent mechanism on a manually operated spool valve. This design has three modes of operation, no-detent, continuous detent and kick-out detent. The no-detent position allows flow to pass through the relief valve, from a first port to a second port and bypass the relief function. The pressure created, disengages the detent mechanism in the spool valve. The spool always returns to neutral position as long as pressure is present. The continuous detent position blocks the flow from a first port to a second port. The kick-out detent position allows flow to pass from the first port to the second port to override (kick-out) the detent mechanism in the spool when the pressure is greater than 2600 psi.

7 Claims, 4 Drawing Sheets

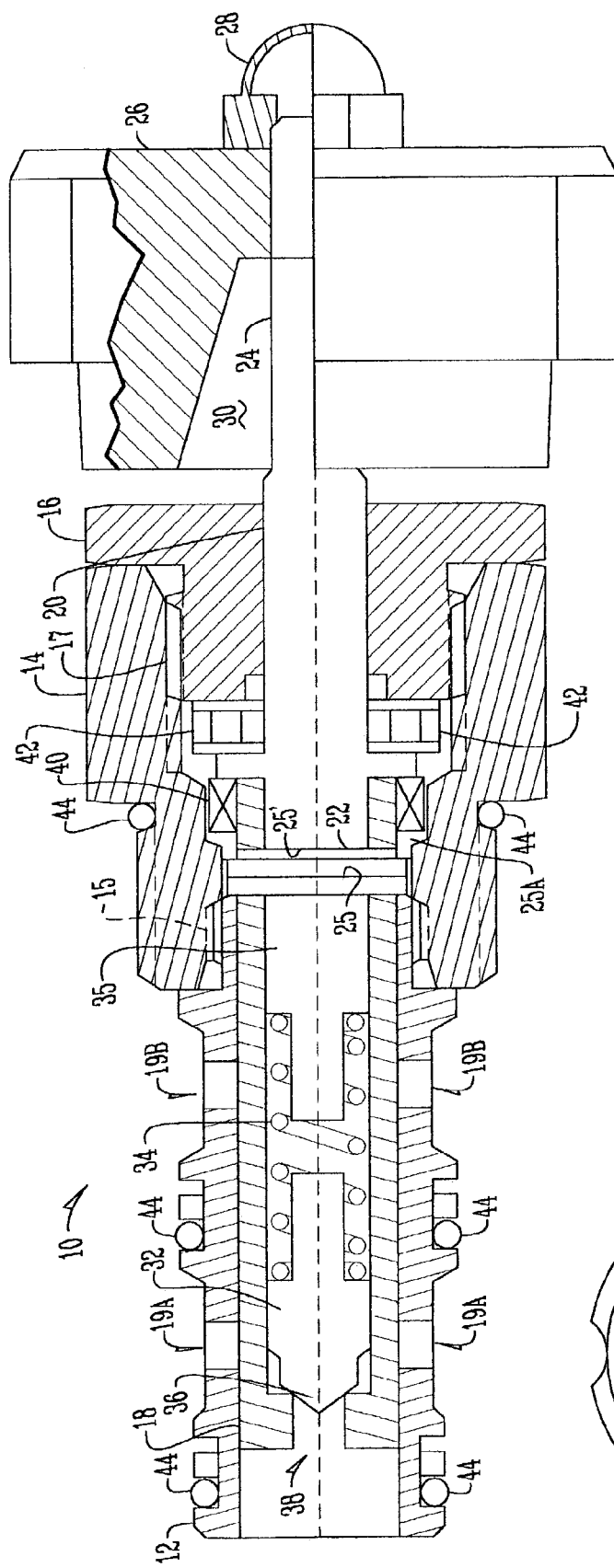
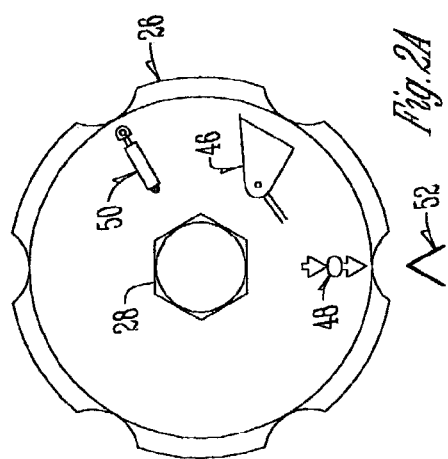
Fig. 2
Fig. 2A

SELECTABLE DETENT RELIEF VALVE

BACKGROUND OF THE INVENTION

A plurality of single detent mode spool valves are used to support the need for multiple modes of operation of certain hydraulic equipment such as an implement lift using hydraulic cylinders, or an auger or trencher chain drive motor. Using technology of this type requires that separate manual spool valves be incorporated for each distinct mode of operation that is required.

It is therefore a principal object of this invention to provide a single multiple detent mode manual spool valve.

A further object of this invention is to provide a manual spool valve that allows the operator to select the detent functions for the manual spool valve by simply selecting the appropriate mode on the relief valve and placing the actuator in the associated position.

A still further object of this invention is to provide a manual spool valve that enhances the safe control of the equipment of which it is a part.

These and other objects will be apparent to those skilled in the art.

SUMMARY OF THE INVENTION

The selectable detent relief valve of this invention is used to operate a hydraulic detent mechanism on a manually operated spool valve. This design has three modes of operation, no-detent, continuous detent and kick-out detent. The no-detent position allows flow to pass through the relief valve, from a first port to a second port and bypass the relief function. The pressure created disengages the detent mechanism in the spool valve. The spool always returns to neutral position as long as pressure is present. The continuous detent position blocks the flow from a first port to a second port. Because there is no flow to disengage the detent mechanism the operator must manually push the spool out of detent and back to neutral position. The kick-out detent position allows flow to pass from a first port to a second port to override (kick-out) the detent mechanism in the spool when the pressure is greater than 2600 psi. The spool is repositioned automatically to neutral position. Each position of the selectable detent relief valve also incorporates a detent in the handle design to ensure the mode of operation is maintained until the operator selects a new mode. The default mode is the no-detent mode. When the selector knob is rotated toward one of the other modes and is not fully rotated, the valve will rotate back to the no-detent mode.

BRIEF DESCRIPTION OF THE DRAWINGS

FIG. 2 is a sectional view of a spool valve in its "continuous detent" position;

FIG. 2A is an end elevational view of a control knob of FIG. 2;

DESCRIPTION OF THE PREFERRED EMBODIMENT

Figure 1:
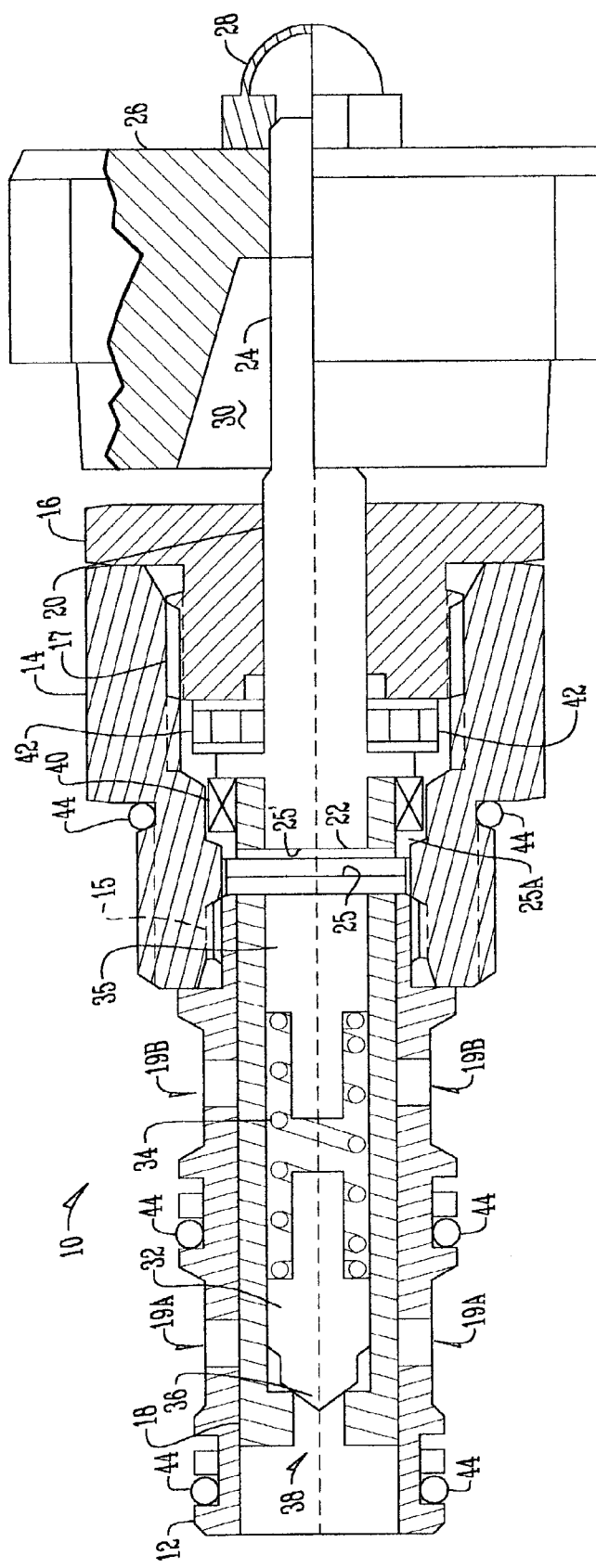
FIG. 1 is a sectional view of a spool valve in its "no-dent" position.

With reference to FIG. 1, the valve 10 includes a sleeve 12 which fits into one end of plug 14 by means of splines 15. A guide 16 fits into the plug 14 by means of splines 17. Spool 18 is slidably mounted within sleeve 12 and plug 14. Sleeve 12 has ports 19A and 19B which at times register with ports 19C in spool 18 (FIG. 3).

Figure 4:
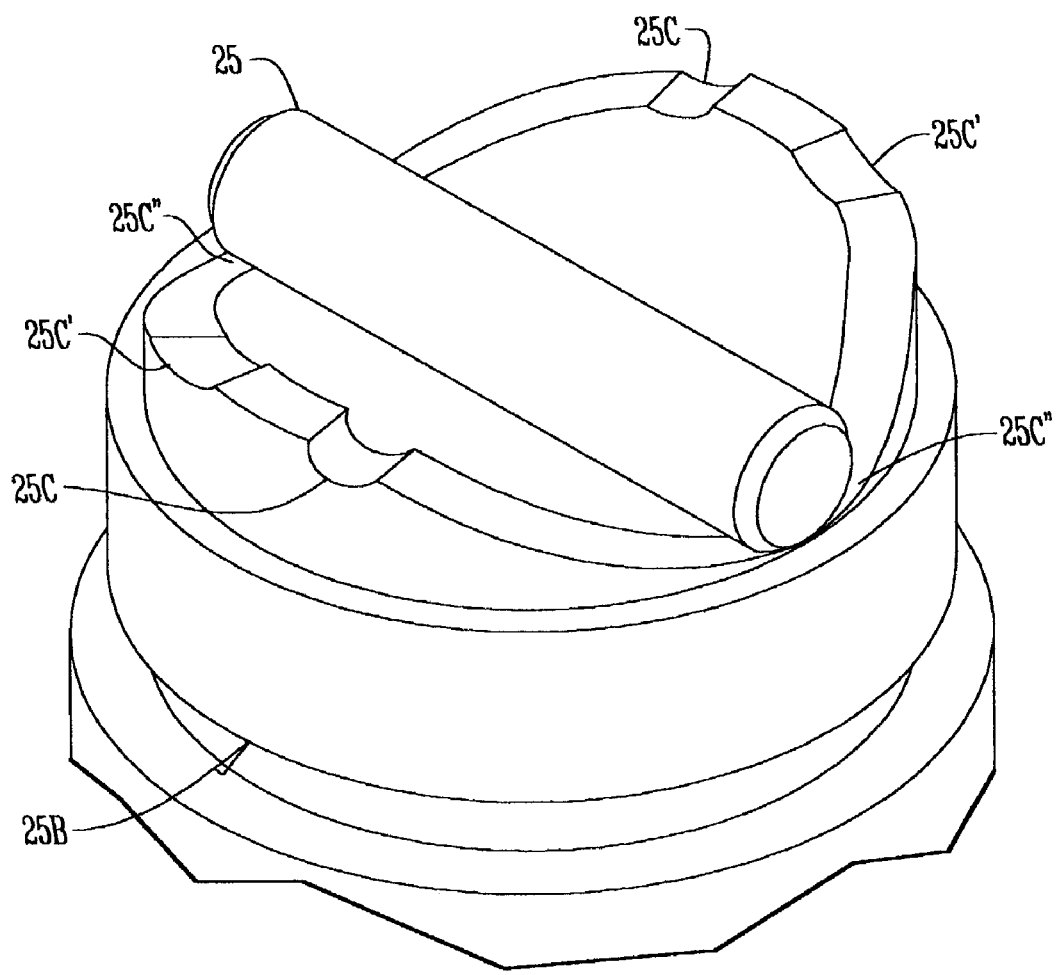
FIG. 4 is a perspective view of a cam means influencing the three modes of control knob.

The control stem 20 extends through the center of guide 16 and has an inner end 22 and an outer end 24. A dowel pin 25 extends through transverse slot 25'. A load washer 25A is located adjacent slot 25' (FIG. 1). As shown in FIG. 4, sleeve 25B has detent notches 25C, 25C' and 25C". The pin 25 is adapted to dwell in opposite notches 25C", 25C', or 25C depending on the position of the knob 26. A nut 28 and collet 30 serve to attach the knob 26 to the control stem 20.

Figure 3:
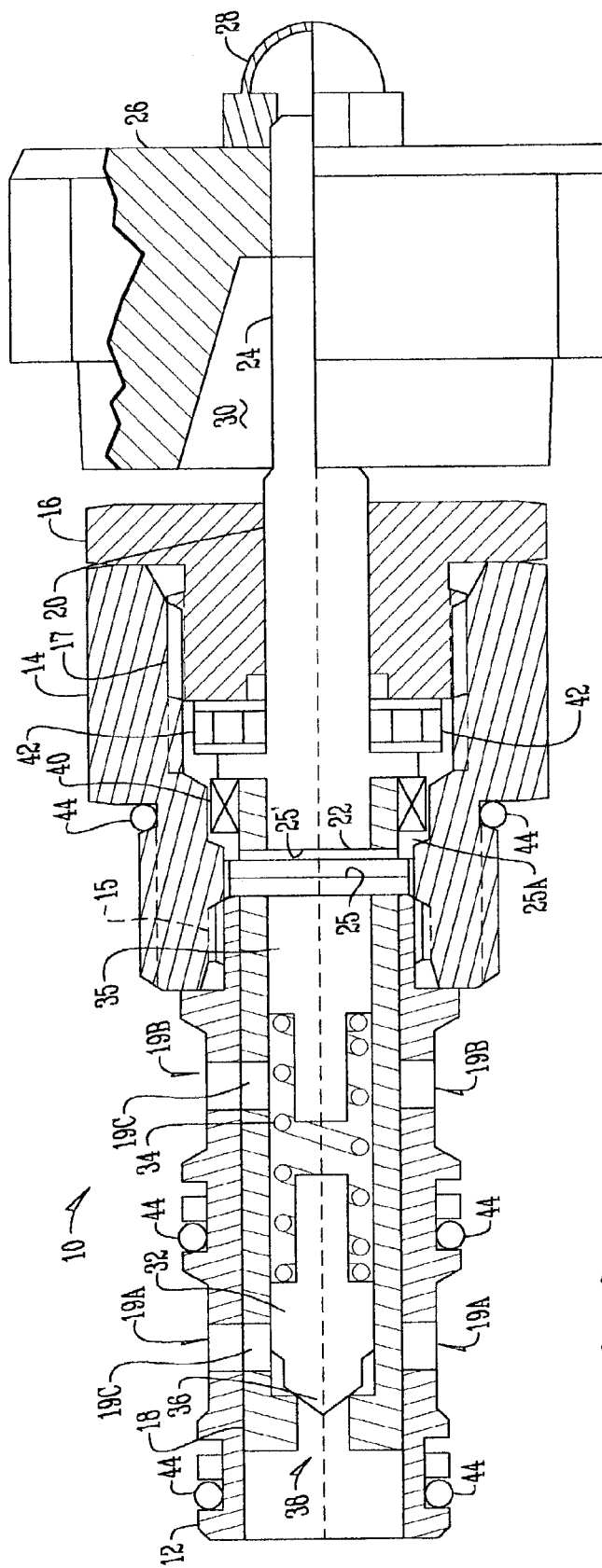
FIG. 3 is a sectional view of a spool valve in its "kick-out" position.

With reference to FIGS. 1, 2 and 3, the spool 18 has a dart 32 on its outer end. The spool is urged in an outward direction by spring 34 which engages a stop 35 on an inward end and a shoulder on dart 32 on an outer end. The numeral 36 designates the pointed outer end of the dart which closes on port 38 and which will open port 38 only when sufficient fluid pressure is on the port 38 to compress spring 34 whereupon the pointed outer end 36 of the dart will withdraw from contact with the port 38.

With reference to FIGS. 1, 2 and 3, a wave spring 40 is mounted rearwardly of load washer 25A. A thrust bearing 42 extends around control stem 20. A plurality of seals 44 are located around sleeve 12 and plug 14 to seal valve 10 in connection with a supporting body (not shown).

Figure 1A:
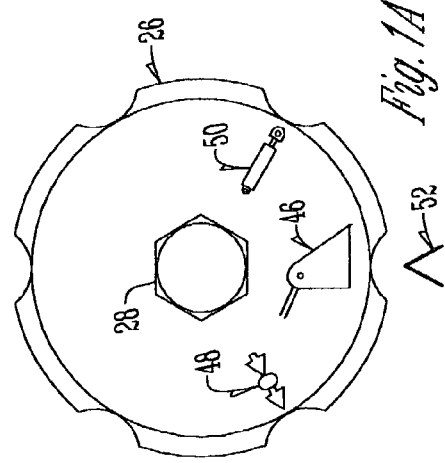
FIG. 1A is an end elevational view of a control knob of FIG. 1.
Figure 3A:
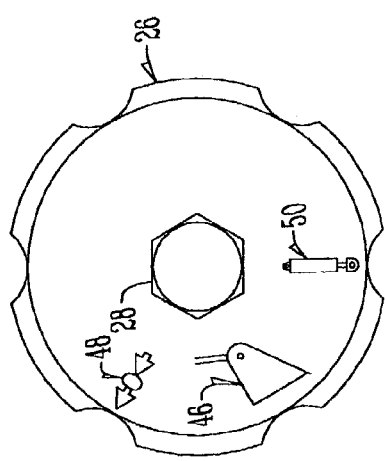
FIG. 3A is an end elevational view of a control knob of FIG. 3.

With reference to FIGS. 1A, 2A and 3A, the numeral 46 designates the no-detent position; the numeral 48 represents the continuous detent position; and the numeral 50 designates the kick-out position. When the knob 26 is turned to the position shown in FIGS. 1A, 2A and 3A wherein the indicia's 46, 48 or 50 are in alignment with the mode position 52, the position of the components of the valve 10 will be as shown in FIGS. 1, 2 and 3, respectively.

With reference to FIG. 1, the knob 26 is connected to the control stem 20. The dowel pin 25 connects the control stem 20 and the spool 18. The wave spring 40 applies an axial force on the load washer 25A and the dowel pin 25. The dowel pin 25 contacts pairs of detent notches 25, 25C', or 25C" that lock the spool in one of the three selectable positions. The spool 18 in the control stem 20 incorporate a slot 25' to allow the dowel pin 25 to move along the axis of the valve 10. This takes place as the spool 18 is rotated within the sleeve 25B and moves along the profile of the end of the sleeve that has the cam profile comprised of the pairs of detent notches 25C, 25C', and 25C", (FIG. 4) for the detent features. In the no-detent position as shown in FIG. 1, the supply pressure is bypassed from the port 38 to the port 19A since the inlet pressure at port 38 can reach 3,000 psi and load the spool 18 with a high axial force, the thrust bearing 42 was added to reduce the required torque to rotate the spool 18.

As previously indicated, FIGS. 1 and 1A show the valve in the "no-detent" position. In this position, the relief valve 10 is in a "bypass" mode. This allows the flow to pass through the valve and hold the kick-out function open 100% of the time. As a result, the spool 18 always returns to a neutral position.

With reference to FIG. 2, the valve 10 is in the continuous detent position where the spool 18 blocks the flow at port 38. When the pressure at port 38 increases to the cracked pressure of the dart 32, the flow has no path of escape since both ports 19A and 19B are blocked. The fluid pressure equalizes on each side of the dart 32 and the spring 34 overrides the pressure to close the dart onto the seat of port 38.

Thus, as depicted in FIGS. 2 and 2A, the "continuous detent" position is in effect. In this position, the relief valve 10 is in a "blocking" mode. This blocks the flow of fluid from passing through the valve. As a result, the spool will always have a detent function and the "kick-out" function is disabled.

With reference to FIGS. 3 and 3A, the kick-out position is shown wherein the spool allows flow from port 19A to port 19B when the system pressure is greater than 2600 psi. The ports 19C in the spool 18 are registered with the ports 19A and 19B in the sleeve 12, thus providing a path for the oil. Port 19B is connected to tank pressure so that the relief pressure is independent of the pressure at port 19A.

In the kick-out position, the valve 10 is in its relief mode. This allows the flow of fluid to pass through the valve when the pressure exceeds 2600 psi (180 bar). When this happens, the kick-out function is activated. As a result, the spool will return the neutral position.

From the foregoing, it is seen that the valve 10 is used to operate a hydraulic detent mechanism on a manually operated spool valve. The knob on the valve is used to create the three modes of operation, i.e., no-detent, continuous detent, and kick-out detent. It is seen that the no-detent position allows the fluid flow to pass through the relief valve from port 38 to port 19A and bypass the relief function. The pressure thus created, disengages the detent mechanism in the valve 10. The spool 18 always returns to a neutral position as long as pressure is present. The continuous detent position blocks the flow from port 38 to port 19A. Because there is no flow to disengage the detent mechanism, the operator must manually push the control spool out of detent and back to a neutral position. The kick-out detent position allows fluid flow to pass from port 38 to port 19A to override (kick-out) the detent mechanism in the spool 18 when the pressure is greater than 2600 psi. The spool is repositioned automatically to a neutral position. Each position of the valve 10 also incorporates a detent in the handle design to ensure that the mode of operation is maintained until the operator selects a new mode. The default mode is the no-detent mode. When the selector knob 26 is rotated toward one of the other modes and is not fully rotated, the valve will rotate back to the no-detent mode.

The valve of this invention is used to operate a hydraulic detent mechanism on a manually operated spool valve to enable distinctly different modes of operation for the manual spool valve. Each of the separate selectable modes of the valve create a distinct functional characteristic for the detent mechanism. The result is that the manual spool valve is operable in different detent modes based on the relief valve function setting that is selected.

Since the relief valve is the "operator" for the hydraulic detent mechanism of the valve, each distinct selectable mode causes the manual spool valve to function in a distinctively different manner. The advantage is that a single manual spool valve can be utilized rather than having to have additional separate manual spool valves to support the need for multiple modes of operation. The instant invention allows a machine operator to select the desired detent function for the manual spool valve by simply selecting the appropriate mode on the relief valve and placing the actuator in the associated position.

When the relief valve is set in the no-detent position, the spool valve is spring returned to its neutral position and could be used to actuate boom positioning such as raise and lower or swing. Placing the valve in the continuous mode position would cause the manual spool valve to hold in the position that the operator places it, and could function as a flow control for an auger or trencher chain drive motor. Further, when using the kick-out detent setting of the valve, the valve will hold its set position until a pressure limiting setting is achieved which releases the detent allowing the manual spool valve to return to neutral. This mode could be used to control the function of an implement lift and lower cylinder.

Most importantly, the instant invention enables the replacement of multiple single detent mode manual spool valves with a single multiple detent mode manual spool valve by incorporating a relief valve which has selectable functional modes to control the detent function of the valve.

It is therefore seen that this invention will accomplish at least all of its stated objectives.

What is claimed is:

1. A multi-mode relief valve having a multi-detent system with a spool having a plurality of functional modes, comprising,
   a manual operating means associated with the spool to selectively move the spool into its various functional modes;
   wherein the functional modes include a no-detent mode wherein the spool is in a neutral position which continuously passes the flow of fluid through the valve regardless of a predetermined pressure;
   wherein the functional modes include a continuous detent position which blocks the flow of fluid from passing through the valve and disables a kick-out function; and
   wherein the functional modes include a kick-out mode wherein fluid is allowed to pass through the valve and causes a kick-out function at a predetermined pressure to cause the spool to return to a neutral position.

2. The valve of claim 1 wherein the predetermined pressure is approximately 2600 psi.

3. The valve of claim 1 wherein the manual operating means is a detent controlled knob for manual operation.

4. A selectable detent relief valve, comprising
   a valve housing,
   a spool rotatably mounted in the housing and having an end capable of closing a first fluid port,
   a plurality of second ports in the housing adapted to register at times with fluid ports in the spool to permit fluid flow therethrough depending on the rotational position of the spool within the housing,
   means on the spool for selectively rotating the spool within the housing,
   and detent means associated with the spool for holding the spool in one of a plurality of rotational positions within the housing to effect different paths of fluid flow into and through the valve to effect different modes of hydraulic operation in hydraulic components on a machine associated with the valve.

5. The valve of claim 4 wherein the spool includes a spring-loaded dart member resiliently closing a fluid port in the spool.

6. The valve of claim 4 wherein the means for selectively rotating the spooi within the housing is a stem and manual knob assembly wherein the stem is operatively connected to the spool through a detent means capable of releasably holding the spool in one of several operational rotational positions.

7. The valve of claim 6 wherein the knob has a plurality of indicia marks to enable an operator to visually ascertain the rotational position of the spool so as to permit the operator to rotate the knob and the spool to a selected rotational position to effect different modes of hydraulic operation in hydraulic components on a machine associated with the valve.

* * * * *